(12) United States Patent
Nilson

(10) Patent No.: US 6,201,367 B1
(45) Date of Patent: Mar. 13, 2001

(54) METHOD FOR RESTARTING A SYNCHRONOUS PERMANENT MAGNET MOTOR STILL ROTATING

(75) Inventor: Thord Agne Gustaf Nilson, Tyresö (SE)

(73) Assignee: Atlas Copco Controls AB, Stockholm (SE)

( * ) Notice: Subject to any disclaimer, the term of this patent is extended or adjusted under 35 U.S.C. 154(b) by 0 days.

(21) Appl. No.: 09/418,227

(22) Filed: Oct. 14, 1999

(30) Foreign Application Priority Data

Oct. 16, 1998 (SE) ................................................ 9803532

(51) Int. Cl.[7] ....................................................... H02P 1/46
(52) U.S. Cl. ........................... 318/705; 318/254; 318/720; 318/721; 318/722; 318/723; 318/724
(58) Field of Search ..................................... 318/705, 716, 318/720–724, 138, 254, 439

(56) References Cited

U.S. PATENT DOCUMENTS

| | | | |
|---|---|---|---|
| 4,829,416 | * | 5/1989 | Inaba et al. ............................. 363/41 |
| 5,488,281 | * | 1/1996 | Unsworth et al. .................... 318/806 |
| 5,565,753 | * | 10/1996 | Chen et al. ............................ 318/809 |
| 5,914,582 | * | 6/1999 | Takamoto et al. .................... 318/801 |
| 6,002,234 | * | 12/1999 | Ohm et al. ............................ 318/729 |

\* cited by examiner

*Primary Examiner*—Paul Ip
*Assistant Examiner*—Rita Leykin
(74) *Attorney, Agent, or Firm*—Frishauf, Holtz, Goodman, Langer & Chick, P.C.

(57) ABSTRACT

A method for restarting a three-phase synchronous permanent magnet motor in which the rotor is still rotating and in which the motor is connected to a drive unit having a DC-stage with voltage measuring means, a variable voltage and frequency output stage including power switching devices, and a means for determining the current in two of the output phases from the drive unit, wherein the motor with the output stage is momentarily short-circuited, the current magnitudes generated by the motor in the two output phases are measured during the short-circuiting moment, the phase angle generated by the motor during the short-circuiting moment is calculated, the rotor speed is determined, and the drive unit is synchronized with the rotor to enable restarting of the motor.

9 Claims, 2 Drawing Sheets

METHOD FOR RESTARTING A SYNCHRONOUS PERMANENT MAGNET MOTOR STILL ROTATING

The invention relates to a method for restarting a synchronous permanent magnet motor still rotating and connected to a drive unit with a variable output AC voltage.

In particularly, the invention concerns a method for resuming operation of a 3-phase synchronous permanent magnetic motor by phasing-in the variable output drive unit relative to the actual speed and rotational angle of the motor rotor, wherein the drive unit has a DC-link with a voltage measuring means and current measuring means on at least two of the output phases.

In prior art technique, phasing-in of a drive unit in relation to the actual speed and position of a rotating motor has been performed by using a voltage sensing and measuring device connected to the three output stage outputs. This device complicates the drive unit unnecessarily, and since it is desirable to make the drive unit simpler, more reliable and less expensive it is an object of the invention to provide a drive unit having the same functional features without including this voltage sensing and measuring device.

A preferred application example of the invention is described below in further detail with reference to the accompanying drawings.

Figure 1:
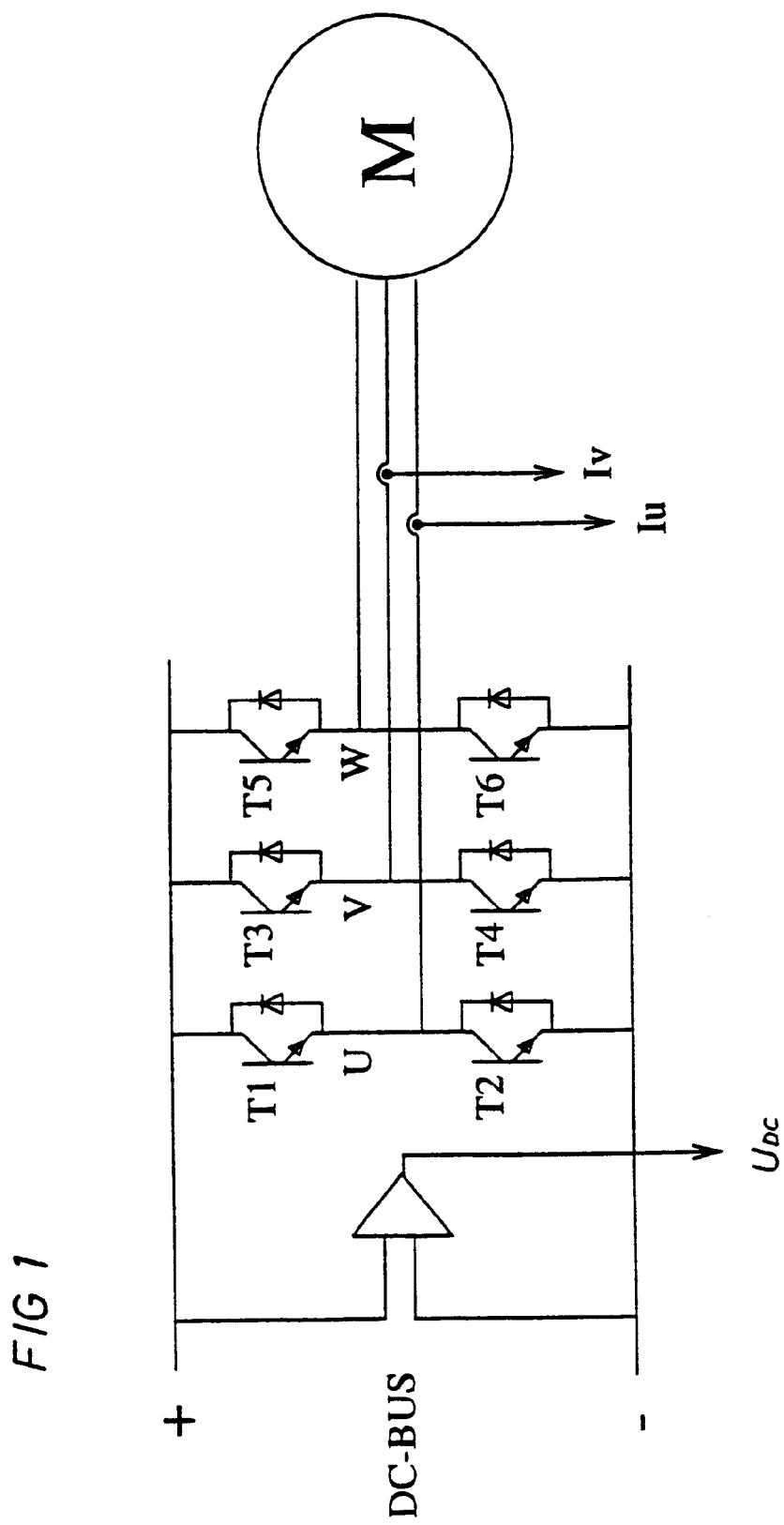
FIG. 1 shows a drive unit and motor circuitry according to the invention.

The drive unit shown in FIG. 1 is connected to a motor M and comprises a DC-stage which is powered by a battery or, dependent on the actual field of use, by an AC net source via a rectifier. A DC-BUS feeds a direct current to an output stage which comprises three phases U, V and W and six power switches T1–T6 with free-wheeling diodes. A voltage measuring means is connected to the DC-BUS to detect the DC voltage.

A current measuring means (not shown per se) is connected to two of the output phases U and V so as to detect the instantaneous values of the motor phase currents $I_U$ and $I_V$. The states of the power switches T1–T6 are controlled in a conventional way by a PWM controller (not shown).

The operational features of the illustrated drive unit as well as the phasing-in procedure of the latter at restarting the motor is described below with reference to the accompanying drawing figures. At the start of this procedure, it is assumed that in an initial condition all six power switches T1–T6 are in their off conditions, and the motor M is rotating at an unknown speed.

Figure 2:
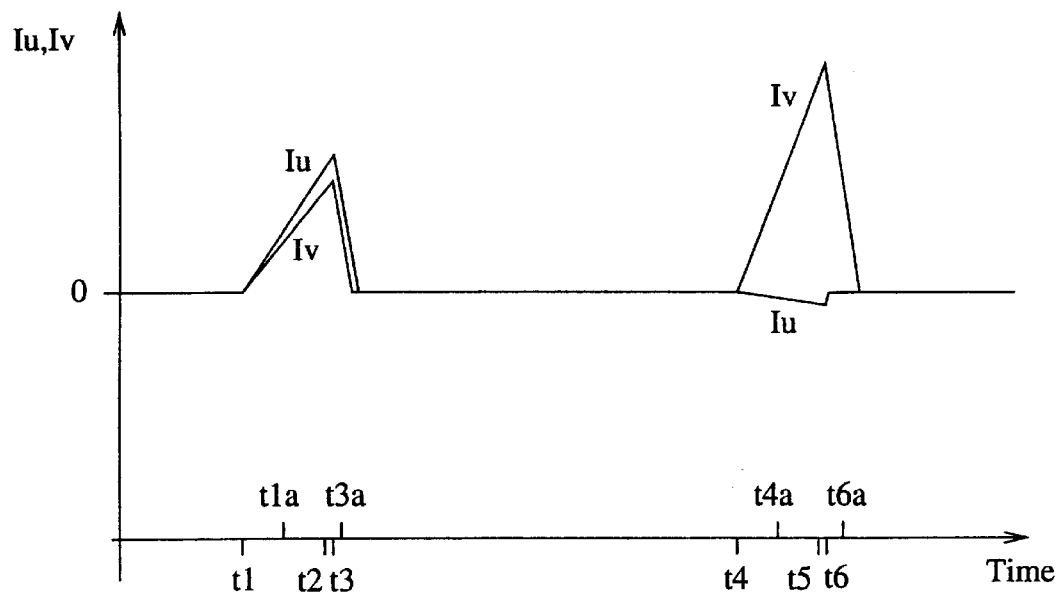
FIG. 2 shows a diagram illustrating current / time relationship during short-circuiting of the motor.
Figure 3:
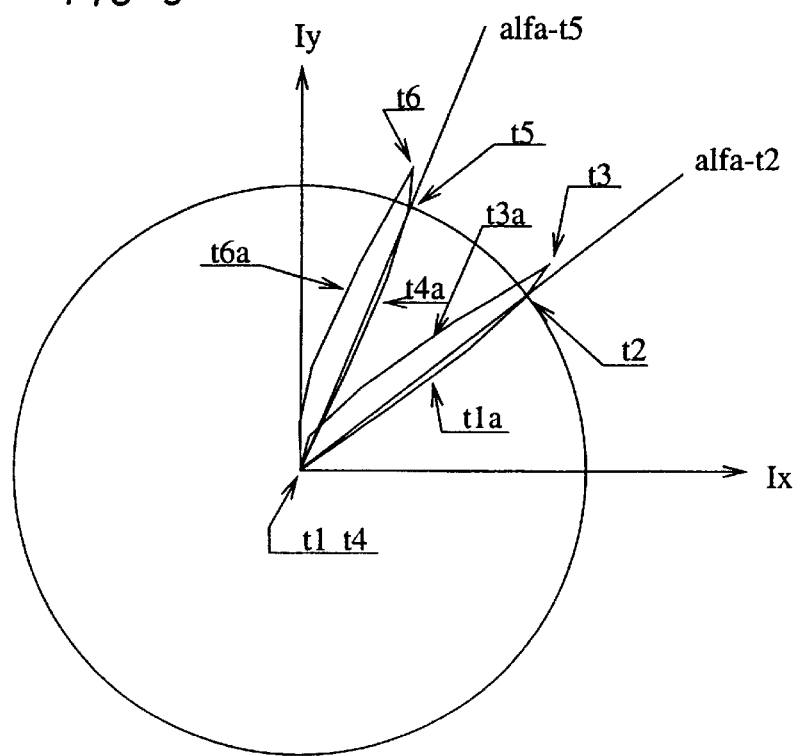
FIG. 3 shows a stator-referenced d / q diagram, illustrating the momentary current and angular position of the rotor at short-circuiting of the motor.

The phasing-in procedure comprises the steps of short-circuiting momentarily the output stage of the drive unit, thereby measuring the current variations in two of the motor phases. In FIG. 2, there is illustrated how the currents $I_U$ and $I_V$ in two motor phases vary over time during two momentary short-circuiting occasions performed within a certain time interval. The same current variations are illustrated in FIG. 3 in a d/q planet diagram. The measured current values in relation to the duration of the short-circuiting step and in relation to each other provides information of the actual speed and rotor position.

Referring to the diagrammatic illustrations, a first short-circuiting starts in point $t_1$, wherein the power devices T2, T4 and T6 are turned on and the currents $I_U$ and $I_V$ start rising. At $t_2$ the values of the currents $I_U$ and $I_V$ are sampled, and at $t_3$ the power devices T2, T4 and T6 are turned off. At point $t_{3A}$ the currents are decreasing back to zero.

From the currents sampled in $t_2$, which are correlated to the angular rotor position in point $t_2$, the angle alfa-$t_2$ may be calculated. See FIG. 3. The radius R of the circle going through the current curves at $t_2$ is proportional to the motor speed divided by the circuit inductance, which is the motor inductance and eventual externally connected filter, provided the time intervals are chosen so as to make the circuit resistance neglectable. Thus, knowing the inductance in the motor circuit and the motor voltage constant it is possible to calculate the approximate motor speed.

It should be noted though, that in FIG. 3, the phase displacement during short-circuiting is illustrated in a somewhat exaggerated way in order to show more clearly the course of events.

In order to improve the speed calculation accuracy and to make a speed estimation without knowing the motor inductance, another short-circuiting steps may be performed at a later occasion. Accordingly, at $t_4$ the power devices T2, T4 and T6 are turned on, and the currents $I_U$ and $I_V$ start rising. At $t_{4A}$, the current values have increased to a certain extent, and at $t_5$ the current values are sampled.

At $t_6$, the power devices T2, T4 and T6 are turned off, and the current values start decreasing via point $t_{6A}$ back to zero. From the current samples taken at $t_5$, it is possible to calculate the angle alfa-$t_5$, which is correlated to the angular position of the rotor at $t_5$.

Now, by dividing the angular interval: alfa-$t_5$–alfa-$t_2$ by the time interval: $t_5$–$t_2$ there is obtained the electrical speed of the motor M, which also gives the frequency to be used at phasing-in the drive unit.

These events may be repeated with successively larger intervals until there is obtained an accurate enough motor speed estimation.

In order to adjust the current response amplitude, the short-circuiting duration may simply be extended, i.e. the value of $t_2$–$t_1$ and the value of $t_5$–$t_4$. See FIG. 2.

For restarting the motor, the correct phase, frequency, and amplitude of the generated voltage has to be set to match the motor voltage. The generated phase and frequency are known by measurement, and the motor voltage is either calculated from: motor-frequency * motor-voltage-constant, or derived from the radius R of the current circle. See FIG. 3.

The correct drive unit voltage output is either measured or estimated on the DC-BUS voltage.

When the PWM controller has been set to generate the matching voltage, frequency and phase of the motor, the actual switching of the power transistors can be established. The motor is now restarted, and the PWM controller and switches will from now on operate in the conventional way.

What is claimed is:

1. Method for restarting a three-phase synchronous permanent magnet electric motor having its rotor still at rotation, wherein the motor is connected to a drive unit having a DC-stage with a voltage measuring means, a variable voltage and frequency output stage having power switching devices, and a means for determining the current in at least two of the output phases from said drive unit, comprising:

I) short-circuiting momentarily the motor with said output stage,
II) detecting during said short-circuiting moment the current magnitudes generated by the motor in at least two of the motor phases,
III) calculating during said short-circuiting moment the phase angle generated by the motor,
IV) determining the rotor speed and position,
V) synchronizing the drive unit with the rotor, and
VI) restarting the motor.

2. Method according to claim 1, wherein the voltage amplitude generated by the motor is calculated.

3. Method according to claim 1, wherein the motor with said output stage of said drive unit is momentarily short-circuited at two or more occasions at certain time intervals, and the current magnitude values measured at each short-circuiting occasion is compared to those measured at another short-circuiting occasion or occasions to determine the difference in phase angle obtained during said certain time interval or intervals and, hence, the actual rotor speed.

4. Method according to claim 1, wherein the duration of said short-circuiting moment is chosen so as to obtain a magnitude of the current generated by the motor having an amplitude high enough to give a favourable current measurement accuracy.

5. Method according to claim 1, wherein said means for determining the current in at least two of the output phases of said drive unit is connected directly to the motor phases.

6. Method according to claim 1, wherein said means for determining the current in at least two of the output phases of said drive unit is connected to said power switching devices.

7. Method according to claim 1, wherein said means for determining the current in at least two of the output phases of said drive unit is connected to said DC-stage.

8. Method according to claim 2, wherein the motor with said output stage of said drive unit is momentarily short-circuited at two or more occasions at certain time intervals, and the current magnitude values measured at each short-circuiting occasion is compared to those measured at another short-circuiting occasion or occasions to determine the difference in phase angle obtained during said certain time interval or intervals and, hence, the actual rotor speed.

9. Method according to claim 2, wherein the duration of said short-circuiting moment is chosen so as to obtain a magnitude of the current generated by the motor having an amplitude high enough to give a favourable current measurement accuracy.

* * * * *

(12) EX PARTE REEXAMINATION CERTIFICATE (8257th)
United States Patent
Nilson

(10) Number: US 6,201,367 C1
(45) Certificate Issued: May 24, 2011

(54) METHOD FOR RESTARTING A SYNCHRONOUS PERMANENT MAGNET MOTOR STILL ROTATING

(75) Inventor: Thord Agne Gustaf Nilson, Tyresö (SE)

(73) Assignee: Inmotion Technologies Aktietolag, Stockholm (SE)

Reexamination Request:
No. 90/010,962, Apr. 28, 2010

Reexamination Certificate for:
Patent No.: 6,201,367
Issued: Mar. 13, 2001
Appl. No.: 09/418,227
Filed: Oct. 14, 1999

(51) Int. Cl.
*H02P 1/46* (2006.01)

(52) U.S. Cl. .................. 318/705; 318/685; 318/696; 318/254; 318/720; 318/721; 318/722; 318/723; 318/724

(58) Field of Classification Search .................. None
See application file for complete search history.

(56) References Cited

U.S. PATENT DOCUMENTS 5,475,292 A 12/1995 Nakanishi et al.

6,201,367 B1 3/2001 Nilson

FOREIGN PATENT DOCUMENTS

WO 9534125 12/1995

OTHER PUBLICATIONS

Julius Luukko, Permanent Magnet Synchronous Motor Drive Based On Direct Flux Linkage and Torque Control, Lappeenranta University of Technology, Oct. 23, 1996, 94 pages. (English Translation attached, 16 pages).

*Primary Examiner* — Robert L Nasser

(57) ABSTRACT

A method for restarting a three-phase synchronous permanent magnet motor in which the rotor is still rotating and in which the motor is connected to a drive unit having a DC-stage with voltage measuring means, a variable voltage and frequency output stage including power switching devices, and a means for determining the current in two of the output phases from the drive unit, wherein the motor with the output stage is momentarily short-circuited, the current magnitudes generated by the motor in the two output phases are measured during the short-circuiting moment, the phase angle generated by the motor during the short-circuiting moment is calculated, the rotor speed is determined, and the drive unit is synchronized with the rotor to enable restarting of the motor.

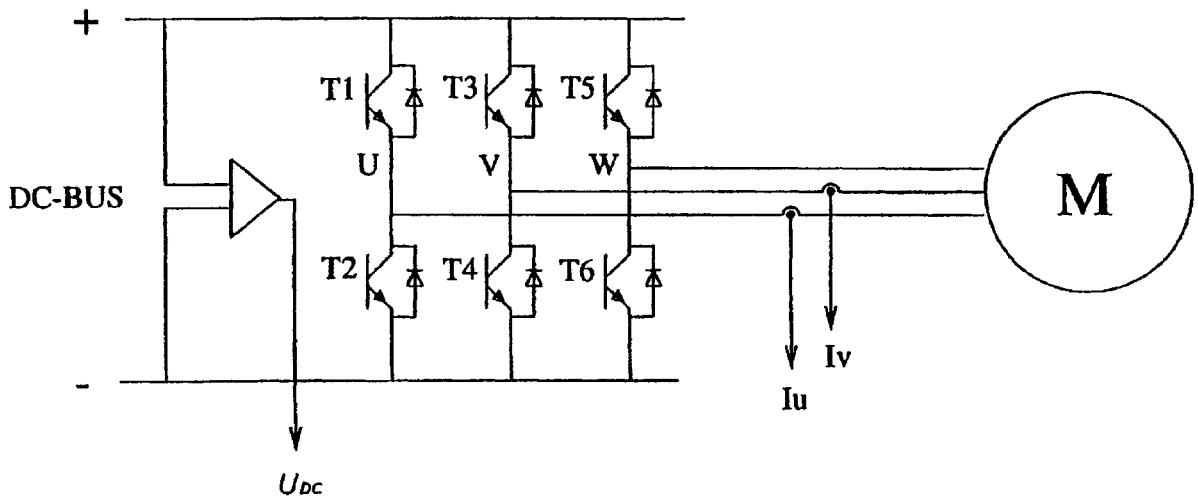

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-9 are cancelled.

* * * * *